US012658369B2

(12) United States Patent
Akiba et al.

(10) Patent No.: US 12,658,369 B2
(45) Date of Patent: Jun. 16, 2026

(54) DIELECTRIC COMPOSITION AND ELECTRONIC COMPONENT

(71) Applicant: TDK CORPORATION, Tokyo (JP)

(72) Inventors: Hiroki Akiba, Tokyo (JP); Tetsuhiro Takahashi, Tokyo (JP); Toshihiro Iguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 449 days.

(21) Appl. No.: 18/469,157

(22) Filed: Sep. 18, 2023

(65) Prior Publication Data

US 2024/0105388 A1 Mar. 28, 2024

(30) Foreign Application Priority Data

Sep. 28, 2022 (JP) ................................. 2022-155181

(51) Int. Cl.
| | |
|---|---|
| *H01G 4/12* | (2006.01) |
| *C01G 35/00* | (2006.01) |
| *H01G 4/30* | (2006.01) |

(52) U.S. Cl.
CPC ......... *H01G 4/1263* (2013.01); *C01G 35/006* (2013.01); *H01G 4/30* (2013.01); *C01P 2002/52* (2013.01); *C01P 2006/40* (2013.01)

(58) Field of Classification Search
CPC . H01G 4/1263; C01G 35/006; C01P 2002/52; C04B 2235/3215; C04B 2235/3244; C04B 2235/76; C04B 35/495
See application file for complete search history.

(56) References Cited

U.S. PATENT DOCUMENTS

| | | |
|---|---|---|
| 2019/0241476 A1 | 8/2019 | Nomura et al. |
| 2022/0230776 A1 | 7/2022 | Iguchi et al. |

FOREIGN PATENT DOCUMENTS

| | | |
|---|---|---|
| JP | 2022-111642 A | 8/2022 |
| WO | 2017/163842 A1 | 9/2017 |
| WO | 2018-074290 A1 | 4/2018 |

OTHER PUBLICATIONS

Translation of Mar. 25, 2026 Office Action issued in Japanese Application No. 2022-155181.

*Primary Examiner* — Laura A Auer

(74) *Attorney, Agent, or Firm* — Oliff PLC

(57) ABSTRACT

A dielectric composition including a tungsten bronze type composite oxide as a main component represented by $(Ba_{1-x}Sr_x)_aR_bZr_cTa_dO_{30+0.5e}$ in terms of an atomic ratio. In the dielectric composition, $c=(2a+3b-10)-e$ and $d=(20-2a-3b)+e$ are satisfied. R includes at least one selected from the group consisting of La, Ce, Pr, Nd, Sm, Eu, Gd, Tb, Dy, Ho, Er, Tm, Yb, Lu, Y, and Sc. In the dielectric composition, $0.000 \leq x \leq 0.500$, $5.100 \leq a \leq 5.860$, $0.000 \leq b \leq 0.100$, and $-0.150 \leq e \leq 0.150$ are satisfied.

8 Claims, 2 Drawing Sheets

DIELECTRIC COMPOSITION AND ELECTRONIC COMPONENT

BACKGROUND

The present disclosure relates to a dielectric composition and an electronic component.

Patent Document 1 discloses a technology relating to a dielectric composition including Sr and Ta as a main component.

Patent Document 2 discloses a technology relating to a dielectric ceramic composition including a first component and a second component; in which the first component includes one or more selected from the group consisting of an oxide of Ca, an oxide of Sr, and an oxide of Ba; one or more selected from an oxide of Ti and an oxide of Zr; and one or more selected from the group consisting of an oxide of Nb and an oxide of Ta as essential components, and the second component includes an oxide of Mn.

[Patent Document 1] Japanese Patent Application Laid-Open No. 2022-111642

[Patent Document 2] WO 2018/074290

SUMMARY

The object of the present disclosure is to obtain a dielectric composition having good relative permittivity, specific resistance under high temperature high electric field, and highly accelerated lifetime.

SUMMARY

A dielectric composition according to the present disclosure includes a tungsten bronze type composite oxide as a main component represented by $(Ba_{1-x}Sr_x)_aR_bZr_cTa_dO_{30+0.5e}$ in terms of an atomic ratio, wherein $$c=(2a+3b-10)-e,$$

$$d=(20-2a-3b)+e,$$

R includes at least one selected from the group consisting of La, Ce, Pr, Nd, Sm, Eu, Gd, Tb, Dy, Ho, Er, Tm, Yb, Lu, Y, and Sc, $$0.000 \leq x \leq 0.500$$

$$5.100 \leq a \leq 5.860$$

$$0.000 \leq b \leq 0.100, \text{ and}$$

$$-0.150 \leq e \leq 0.150.$$

In the dielectric composition, x may be within a range of $0.000 \leq x \leq 0.100$ and a may be within a range of $5.500 \leq a \leq 5.800$.

In the dielectric composition, e may be within a range of $0.020 \leq e \leq 0.100$.

An electronic component according to the present disclosure includes the above-mentioned dielectric composition.

DETAILED DESCRIPTION

First Embodiment

<Multilayer Ceramic Capacitor>

Figure 1:
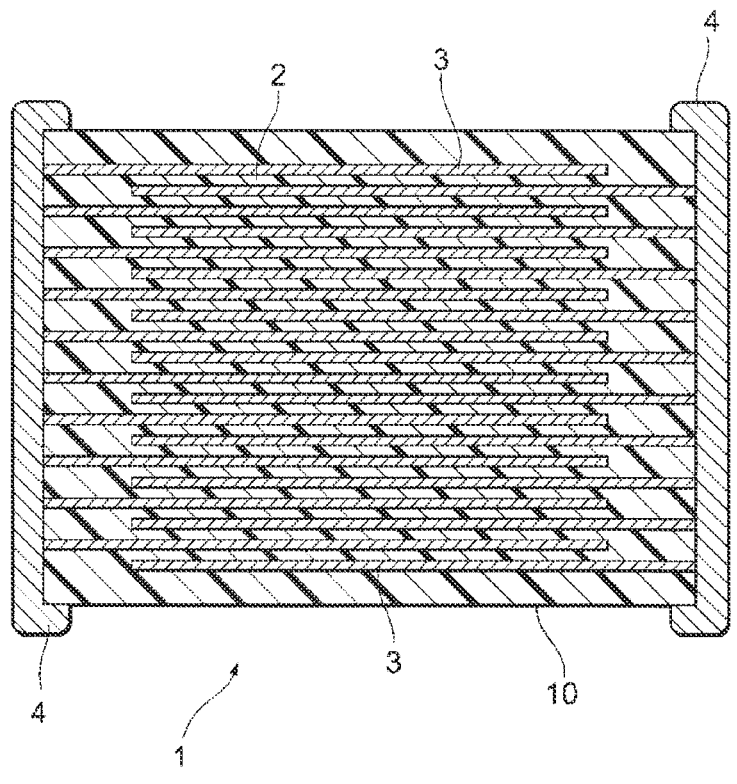
FIG. 1 is a schematic cross-sectional diagram of a multilayer ceramic capacitor according to one embodiment of the present disclosure.

A multilayer ceramic capacitor 1 as one example of an electronic component according to the present embodiment is shown in FIG. 1. The multilayer ceramic capacitor 1 includes an element main body 10 in which dielectric layers 2 and internal electrode layers 3 are stacked in alternating manner. At both ends of this element main body 10, a pair of external electrodes 4 is formed which conduct with the internal electrode layers 3 arranged in alternating manner in the element main body 10. A shape of the element main body 10 is not particularly limited, however, usually it is rectangular shape. Also, a size of the element main body 10 is not particularly limited, and it may be an appropriate size depending on the purpose of use.

<Dielectric Layer>

The dielectric layer 2 includes the dielectric composition according to the present embodiment which is described in below.

A thickness of the dielectric layers 2 per layer (interlayer thickness) is not particularly limited, and it may be set to any thickness depending on the desired property, the purpose of use, and so on. Usually, the interlayer thickness may preferably be 30 μm or less, more preferably 15 μm or less, or further preferably 10 μm or less.

<Internal Electrode Layer>

In the present embodiment, the internal electrode layers 3 are stacked such that each end part of the internal electrode layers 3 exposes to the surfaces of the both ends of the element main body 10 which are facing each other.

A conductive material included in the internal electrode layer 3 is not particularly limited. As metals used for the conductive material, for example, palladium, platinum, silver-palladium alloy, nickel, nickel-based alloy, copper, copper-based alloy, and so on may be mentioned. Note that, in nickel, nickel-based alloy, copper, or copper-based alloy, 0.1 mass % or less of various trace components such as phosphorous and/or sulfur may be included. Also, the internal electrode layers 3 may be formed using a commercially available electrode paste. The thickness of the internal electrode layer 3 may be determined according to the purpose of use and so on.

<External Electrode>

A conductive material included in the external electrode 4 is not particularly limited. Any known conductive material can be used. For example, nickel, copper, tin, silver, palladium, indium, gallium, platinum, gold, alloy of these, a conductive resin, and so on may be mentioned. A thickness of the external electrode layer 4 is not particularly limited, and it may be determined according to the purpose of use.

<Dielectric Composition>

The dielectric composition constituting the dielectric layer 2 according to the present embodiment includes a tungsten bronze type composite oxide as a main component. The tungsten bronze type composite oxide has a tungsten bronze type crystal structure.

Generally, the composition of compound having the tungsten bronze type crystal structure is shown by a chemical formula of $A_6B_{10}O_{30}$ and so on. In the tungsten bronze type crystal structure, three-dimensional network is formed in which oxygen octahedrons, formed by arranging six oxygens to the atom occupying the B site, are sharing a top with each other. Further, the atom occupying the A site is positioned between the oxygen octahedrons.

The tungsten bronze type composite oxide included as a main component in the dielectric composition according to the present embodiment (hereinafter, the tungsten bronze type composite oxide may be referred to as the main component) is represented by $(Ba_{1-x}Sr_x)_a R_b Zr_c Ta_d O_{30+0.5e}$ in terms of an atomic ratio, in which $c=(2a+3b-10)-e$, and $d=(20-2a-3b)+e$ are satisfied. Further, $0.000 \leq x \leq 0.500$, $5.100 \leq a \leq 5.860$, $0.000 \leq b \leq 0.100$, and $-0.150 \leq e \leq 0.150$ are satisfied. The dielectric composition according to the present embodiment achieves good relative permittivity, specific resistance under high temperature high electric field, and highly accelerated lifetime.

Ba and Sr are elements which the oxidation state is +2, and these tend to occupy the A site.

R is at least one element selected from the group consisting of La, Ce, Pr, Nd, Sm, Eu, Gd, Tb, Dy, Ho, Er, Tm, Yb, Lu, Y, and Sc. R may be at least one element selected from the group consisting of La, Nd, Dy, and Y. R may be La. R is an element which the oxidation state is +3.

Zr is an element which the oxidation state is +4, and tends to occupy the B site.

Ta is an element which the oxidation state is +5, and tends to occupy the B site.

By referring that the tungsten bronze type composite oxide is represented by a compositional formula $(Ba_{1-x}Sr_x)_a R_b Zr_c Ta_d O_{30+0.5e}$ in terms of an atomic ratio satisfying $c=(2a+3b-10)-e$ and $d=(20-2a-3b)+e$ means that c+d representing a total ratio of Zr and Ta, which tend to occupy B site, is 10. That is, (Element occupying A site):(Element occupying B site):O=(a+b):10:(30+0.5e) is satisfied.

If the amount ratio of each element in the main component matches the chemical stoichiometric ratio of the tungsten bronze type composite oxide, a+b=6 and e=0 are satisfied. However, in the present embodiment, the amount ratio of each element may shift from the chemical stoichiometric ratio.

In the above-mentioned compositional formula, $5.100 \leq a+b \leq 5.960$ is further satisfied. Also, a+b is smaller than 6. As a result, a cation vacancy tends to easily form at the A site of the main component.

When e=0, that is, when (element occupying B site):O=10:30, once the values of a and b are determined, then c and d will be determined accordingly. That is, an amount ratio of Zr to Ta in the main component is determined so that (element occupying B site):O=10:30 is satisfied and a total positive charge of each element of Ba, Sr, R, Zr, and Ta matches with a total negative charge of O.

That is, e represents the level of difference in electric charges generated by change in the amount ratio of Zr and Ta. When e is a positive value, a cation vacancy tends to be generated easily at the A site and/or B site of the main component.

The main component satisfies $0.000 \leq x \leq 0.500$. That is, the main component may not include Sr. When x is too large, a relative permittivity of the dielectric composition tends to decrease easily.

The main component satisfies $5.100 \leq a \leq 5.860$. The larger a is, the easier it is for c to become larger, and the easier it is for the amount of Zr to become larger. Further, the larger the amount of Zr in the main component is, the easier it is to improve a reduction resistance of the dielectric composition, and the easier it is to improve the specific resistance of the dielectric composition under high temperature high electric field condition.

When a is too small, specific resistance of the dielectric composition under high temperature high electric field condition tends to decrease easily. When a is too large, sintering property of the dielectric composition tends to decrease easily and the highly accelerated lifetime of the dielectric composition tends to decrease easily.

The main component satisfies $0.000 \leq b \leq 0.100$. That is, the main component may not include R. When b is too large, the relative permittivity of the dielectric composition tends to decrease easily.

The main component satisfies $-0.150 \leq e \leq 0.150$. When e is too large, an impurity phase tends to form easily in the dielectric composition, and the relative permittivity of the dielectric composition tends to decrease easily. When e is too small, the sintering property of the dielectric composition tends to decrease easily, and the specific resistance under high temperature high electric field condition and the relative permittivity tend to decrease easily.

In the main component, preferably x is within a range of $0.000 \leq x \leq 0.100$ and a is within a range of $5.500 \leq a \leq 5.800$. When x and a are within the above-mentioned ranges, the relative permittivity of the dielectric composition tends to be particularly good.

In the main component, preferably e is within a range of $0.020 \leq e \leq 0.100$. When e is within the above-mentioned range, cation vacancy tends to be formed in an appropriate amount. Further, the cation vacancy tends to easily supplement oxygen defect of the tungsten bronze type crystal structure. Thus, the highly accelerated lifetime tends to easily become particularly good.

The amount ratio of the main component in the dielectric composition is more than 50 mol %. Preferably, it is 60 mol % or more.

The dielectric composition according to the present embodiment may include subcomponents in addition to the main component. A type of the subcomponents is not particularly limited. For example, oxides of Si, oxides of V, oxides of Mn, oxides of Al, and so on may be mentioned. Also, a compound including one or more elements selected from the group consisting of Ba, Sr, R, Zr, Ta, and O which are constituting the tungsten bronze type composite oxide as the main component may also be included as the subcomponent.

Amount ratios of the various subcomponents are not particularly limited, and may be determined according to the desired properties.

The dielectric composition according to the present embodiment may not substantially include niobium, alkali metals, and lead. Here, "may not substantially include niobium, alkali metals, and lead" means that a total amount of "niobium, alkali metals, and lead" is 10 parts by mol or less, or 5 mol parts by mol or less when a total amount of elements included in the dielectric composition except for oxygen is 100 parts by mol.

<Method of Producing Multilayer Ceramic Capacitor>

Next, an example of method of producing the multilayer ceramic capacitor 1 shown in FIG. 1 is described.

In the present embodiment, powders which are starting materials of the main component constituting the above-mentioned dielectric composition are prepared. A method of producing the powders which are the starting materials of the main component is not particularly limited, and it may be produced using a solid phase reaction method such as calcination. A type of powders which are the starting materials of the main component is not particularly limited. For example, oxides of each element included in the main component can be used. Also, various compounds which can give oxides of each element included in the main component by firing can be used. As various compounds, carbonates, oxalates, nitrates, hydroxides, organometallic compounds, and so on may be mentioned. An average particle size of the powders which are the starting materials of the main component is not particularly limited. For example, it may be 2.0 µm or less, or 1.0 µm or less.

The powders of the starting materials of the main component are weighed to give predetermined proportion, and wet mixing is carried using a ball mill or so for predetermined length of time to obtain a mixed powder. The mixed powder is dried, then heat treatment is carried out under the air atmosphere at a temperature within a range of 700 to 1300° C., thereby a calcined powder is prepared. The calcined powder may be pulverized for a predetermined length of time using a ball mill or so.

When the subcomponents are intentionally included in the dielectric composition, powders which become materials of the subcomponents are prepared at the same time. The powders which become materials of the subcomponents may be added to the mixed powder before the calcination, or the powders which become materials of the subcomponents may be added to the calcined powder and mixed.

Next, a paste for forming a green chip is prepared. The obtained calcined powder, a binder, and a solvent are kneaded to form a paste to prepare a dielectric layer paste. As for the solvent and the binder, any known materials may be used. An organic vehicle obtained by dissolving the binder into the solvent in advance may be used. The powders which become the materials of the subcomponents may be kneaded depending on needs. An amount of the binder and an amount of the solvent are not particularly limited, and these may be used in usual amounts.

The dielectric layer paste may include additives such as an inhibitor, a plasticizer, a dispersant, and so on if needed.

An internal electrode layer paste is obtained by kneading the above-mentioned materials of the conductive material, the binder, and the solvent. As for the binder and the solvent, any known materials may be used. An organic vehicle obtained by dissolving the binder into the solvent in advance may be used.

The internal electrode layer paste may include additives such as an inhibitor, a plasticizer, a dispersant, and so on if needed.

A method of forming an external electrode layer is not particularly limited, and when the external electrode layer paste is used, the external electrode layer paste can be prepared in the same way as the internal electrode layer paste.

Using the above-mentioned pastes, a green sheet and an internal electrode pattern are formed, and these are stacked to form a green chip.

A binder removal treatment may be carried out to the obtained green chip if needed. Conditions for the binder removal treatment are not particularly limited. For example, a temperature increasing rate may be within a range of 5 to 300° C./hour, a holding temperature may be within a range of 180 to 500° C., and a temperature holding time may be 0.5 to 24 hours. A temperature decreasing rate is not particularly limited. Atmosphere during the binder removal treatment may be in the air or in reducing atmosphere. As for atmospheric gas in the case of reducing atmosphere, mixed gas of wet $N_2$ and $H_2$ may be used, or wet $N_2$ gas or so may be used. A wetting method is not particularly limited. For example, a wetter or so may be used. In this case, water temperature may be within a range of 5° C. to 75° C. or so.

After the binder removal treatment, the green chip is fired, and an element body 10 is obtained. Firing conditions are not particularly limited. For example, a temperature increasing rate may be within a range of 100 to 5000° C./hour, a holding temperature may be within a range of 1200 to 1450° C., a temperature holding time may be 0.5 to 2.0 hours, and a temperature decreasing rate may be within a range of 100 to 5000° C./hour. Atmosphere while firing may be in the air, or may be reducing atmosphere. In the case that firing is performed under reducing atmosphere, atmosphere may have oxygen partial pressure of $10^{-2}$ to $10^{-7}$ Pa. As atmospheric gas in the case of reducing atmosphere, mixed gas of wet $N_2$ and $H_2$ gas may be used, or wet $N_2$ gas may be used. A wetting method is not particularly limited. For example, a wetter or so may be used. In this case, water temperature may be within a range of 5° C. to 75° C.

After firing, a re-oxidation treatment (annealing) may be performed to the obtained element body 10 if needed. Annealing conditions are not particularly limited. For example, a temperature increasing rate may be within a range of 100 to 5000° C./hour, a holding temperature may be within a range of 850 to 1150° C., a temperature holding time may be 0.5 to 30 hours, and a temperature decreasing rate may be within a range of 100 to 5000° C./hour. Oxygen partial pressure while annealing is preferably set higher than oxygen partial pressure of firing, and the holding temperature is preferably 1150° C. or less. As for atmospheric gas while annealing, mixed gas of wet $N_2$ and $H_2$ gas may be used, or wet $N_2$ gas may be used. A wetting method is not particularly limited. For example, a wetter or so may be used. In this case, water temperature may be within a range of 5° C. to 75° C.

A dielectric composition constituting the dielectric layer 2 of the element body 10 obtained as such is the above-mentioned dielectric composition. Surface polishing is performed to this element body 10. In the case of using the external electrode paste, the external electrode paste is coated and baked to form an external electrode 4. Further, if needed, a coating layer is formed to the surface of the external electrode 4 by a plating or so.

A method of forming the external electrode 4 is not particularly limited. For example, a eutectic alloy may be coated instead of the external electrode layer paste to form the external electrode 4.

As such, the multilayer ceramic capacitor 1 according to the present embodiment is produced.

Second Embodiment

<Thin Film Capacitor>

Figure 2:
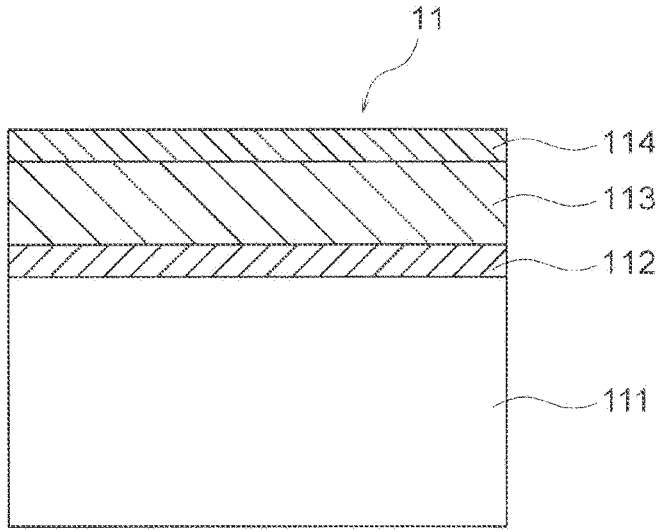
FIG. 2 is a schematic cross-sectional diagram of a thin film capacitor according to one embodiment of the present disclosure.

A schematic diagram of a thin film capacitor 11 according to the present embodiment is shown in FIG. 2. In the thin capacitor 11 shown in FIG. 2, a lower electrode 112 and a dielectric thin film 113 are formed on a substrate 111 in this order, and a upper electrode 114 is formed on the surface of the dielectric thin film 113.

A material of the substrate 111 is not particularly limited, and a silicon monocrystal substrate may be used as the substrate 111 as it is easy to obtain and is excellent from the point of the cost. In the case that flexibility is important, a nickel foil or a copper foil may be used.

Materials for the lower electrode 112 and upper electrode 114 are not particularly limited as long as these function as electrodes. For example, platinum, silver, nickel, and so on may be mentioned. A thickness of the lower electrode 112 is not particularly limited, and for example, it may be within a range of 0.01 to 10 µm. A thickness of the upper electrode 114 is not particularly limited, and for example, it may be within a range of 0.01 to 10 µm.

The composition of the dielectric composition and a crystal structure of a main component which constitute the dielectric thin film 113 according to the present embodiment are the same as discussed in the first embodiment.

A thickness of the dielectric thin film 113 is not particularly limited, and preferably it may be within a range of 10 nm to 1 μm.

<Method of Producing Thin Film Capacitor>

Next, an example of a method of producing the thin film capacitor 111 shown in FIG. 2 is described.

A method of forming a thin film which becomes the dielectric thin film 113 at the end is not particularly limited. A vacuum deposition method, a spattering method, a PLD method (pulse laser deposition method), a MO-CVD method (metal organic chemical vapor deposition method), a MOD method (metal organic decomposition method), a sol-gel method, a CSD method (chemical solution deposition method), and so on may be mentioned.

Trace amounts of impurities and subcomponents may be included in the materials for forming the thin film. However, it is not a problem as long as these do not significantly compromise the function of the dielectric 113 obtained at the end. The dielectric thin film 113 according to the present embodiment may also include trace amounts of impurities and subcomponents as long as the function is not significantly compromised.

In below, one example of a method of forming a dielectric thin film 113 using a PLD method is described.

First, as the substrate 111, a silicon monocrystal substrate is prepared. Next, SiO$_2$, TiO$_x$, and platinum are formed in this order on the silicon monocrystal substrate, and the lower electrode 112 made of platinum is formed. A method of forming the lower electrode 112 is not particularly limited. For example, a spattering method, a CVD method or so may be mentioned.

Next, the dielectric thin film 113 is formed on the lower electrode 112 using a PLD method. Also, part of the lower electrode 112 may be exposed by using a metal mask, and an area without the thin film may be formed.

In the PLD method, first, a target which includes constituting elements of the dielectric thin film 113 is placed in a film forming chamber. Next, pulse laser is irradiated to the surface of the target. Due to the strong energy of pulse laser, the surface of the target immediately evaporates. Further, evaporated product is deposited on the substrate arranged facing the target, thereby the dielectric thin film 113 is formed.

A type of target is not particularly limited, and a sintered metal oxide including the constituting elements of the dielectric thin film 113 to be produced can be used, and also alloy and so on can be used as well. Also, regarding the target, preferably each element is evenly distributed, however, as long as the quality of the obtained dielectric thin film 113 is not influenced, each element may be distributed unevenly.

The target does not necessarily have to be one, and several targets each partially including the constituting elements of the dielectric thin film 113 may be prepared, and thereby the film can be formed. A shape of the target is not particularly limited, and it may be a shape suited for a used film forming device.

Also, when using a PLD method, preferably, infrared laser is used to heat the substrate 111 for forming the film in order to crystalize the dielectric thin film 113 being formed. A heating temperature of the substrate 111 differs depending on the constituting elements and compositions and so on of the dielectric thin film 113 and the substrate 111. For example, the film is formed while heating the substrate 111 to the temperature within a range of 600 to 800° C. By making the temperature of the substrate 111 to a suitable temperature, the dielectric thin film 113 easily crystalizes, and also it can prevent cracks from forming when cooling.

Finally, by forming the upper electrode 114 on the dielectric thin film 113, the thin film capacitor 11 can be produced. Note that, a material of the upper electrode 114 is not particular limited, and silver, gold, copper and so on can be used. Also, a method of forming the upper electrode 114 is not particularly limited. For example, the upper electrode 114 can be made using a deposition method and a spattering method.

Hereinabove, the embodiments of the present disclosure has been explained, however, the present disclosure is not to be limited thereto, and it can be achieved under various different embodiments within the scope which does not exceed the gist of the present disclosure.

In each of the embodiment mentioned in above, the case that the electronic component is a multilayer ceramic capacitor and the case that the electronic component is a thin film capacitor were explained. However, the electronic component according to the present disclosure is not limited to the multilayer ceramic capacitor and the thin film capacitor, and it may be any electronic component including the above-mentioned dielectric composition.

For example, the electronic component according to the present disclosure may be a single layer type ceramic capacitor of which a pair of electrodes is formed to a single layer of dielectric substrate made of the above-mentioned dielectric composition.

The electronic component according to the present disclosure is suitably used as an electronic component for automobile which requires a dielectric composition satisfying good relative permittivity, specific resistance under high temperature high electric field condition, and highly accelerated lifetime.

The electronic component according to the present disclosure is not limited to a capacitor, and it may be a filter, a diplexer, a resonator, a transmitter, an antenna, and so on.

EXAMPLES

Hereinbelow, the present disclosure is described in detail using examples and comparative examples. Note that, the present disclosure is not limited to the below examples.

Experiment Example 1

<Production of Dielectric Layer Paste>

Powders of BaCO$_3$, SrCO$_3$, La(OH)$_3$, Nd$_2$O$_3$, Dy$_2$O$_3$, Y$_2$O$_3$, ZrO$_2$, and Ta$_2$O$_5$ each having an average particle size of 1.0 μm or less were prepared as starting raw materials of the main component. These raw materials were weighed so that the main component (composite oxide) included in the dielectric composition obtained at the end satisfied compositions shown in Tables 1 to 4. Then, ethanol as a dispersant was wet mixed for 24 hours using a ball mill to obtain a mixture. Next, the obtained mixture was dried, and obtained a mixed raw material powder. Then, heat treatment was carried out in the air at a holding temperature of 900° C. for a holding time of 2 hours. Thereby, a calcined powder of the main component was obtained.

The calcined powder of the main component obtained using the above-mentioned method was mixed and pulverized, thereby a dielectric composition raw material powder was obtained.

A solvent was prepared. Specifically, toluene+ethanol solution (toluene:ethanol=50:50 (weight ratio)), a plasticizer (dioctyl phthalate (DOP) (made by J-PLUS Company, Limited), and a dispersant (MALIALIM AKM-0531 (made by NOF)) were mixed in a proportion of 90:6:4 (weight ratio).

Next, 700 g of solvent was added to 1000 g of the dielectric ceramic raw material powder to obtain a mixture.

Next, the obtained mixture was dispersed for 2 hours using a basket mill to prepare a dielectric layer paste. Note that, viscosity of the dielectric layer paste was adjusted so that the dielectric layer pastes of all of the examples and comparative examples had viscosity of 200 cps. Specifically, the viscosity was adjusted by adding a small amount of the toluene+ethanol solution.

<Preparation of Internal Electrode Layer Paste>

As raw materials of the internal electrode layer, Ni powder having an average particle size of 0.2 μm, Al oxide powder having an average particle size of 0.1 μm or less, and Si oxide powder having an average particle size of 0.1 μm or less were prepared. Next, these powders were weighed and mixed so that a total amount of Al and Si was 5 parts by mass to 100 parts by mass of Ni. Then, heat treatment was carried out in mixed gas of wet $N_2$ and $H_2$ at a temperature of 1200° C. or higher. The powder after the heat treatment was pulverized using a ball mill or so, thereby a raw material powder of the internal electrode layer having an average particle size of 0.20 μm was prepared.

An organic vehicle was prepared. Specifically, 8 parts by mass of ethyl cellulose resin was dissolved in 92 parts by mass of butyl carbitol.

Next, 100 parts by mass of the raw material powder of the internal electrode layer, 30 parts by mass of the organic vehicle, and 8 parts by mass of butyl carbitol were kneaded using a triple roll to form a paste, thereby the internal electrode layer paste was prepared.

<Preparation of Multilayer Ceramic Fired Body>

The dielectric layer paste was coated on a PET film to form a green sheet. At this time, the dielectric layer was coated so that a thickness of the green sheet after drying was 4.2 μm. Next, using the internal electrode layer paste, an internal electrode layer of a predetermined pattern was printed on the green sheet. Then, by releasing the green sheet from the PET film, a green sheet printed with the internal electrode layer in a predetermined pattern was prepared. Next, the green sheet printed with the internal electrode layer in a predetermined pattern was stacked in plurality and adhered by pressure to form a green multilayer body. Further, the green multilayer body was cut into a predetermined shape to form green chips.

Next, a binder removal treatment, firing, and an annealing treatment were carried out to the obtained green chips, thereby obtained a multilayer ceramic fired body (element body). Conditions of the binder removal treatment, firing, and the annealing treatment were as shown in below. Also, for the binder removal treatment, firing, and the annealing treatment, a wetter was used to wet the atmospheric gas.

(Binder Removal Treatment)

Temperature increasing rate: 100° C./hour
Holding temperature: 400° C.
Temperature holding time: 8.0 hours
Atmospheric gas: Mixed gas of wet $N_2$ and $H_2$ (Firing)

Temperature increasing rate: 500° C./hour
Holding temperature: 1200° C. to 1450° C.
Temperature holding time: 2.0 hours
Temperature decreasing rate: 100° C./hour
Atmospheric gas: Mixed gas of wet $N_2$ and $H_2$
Oxygen partial pressure: $10^{-2}$ to $10^{-7}$ Pa (Annealing Treatment)

Temperature increasing rate: 200° C./hour
Holding temperature: 800° C. to 1000° C.
Temperature holding time: 2.0 hours
Temperature decreasing rate: 200° C./hour
Atmospheric gas: wet $N_2$ gas
Oxygen partial pressure: $10^{-1}$ Pa <Compositional Analysis>

Compositional analysis was carried out to the dielectric layer (dielectric composition) of the obtained multilayer ceramic fired body by using ICP emission spectroscopic analysis. The results confirmed that the composition after the analysis was the same as the composition shown in Table 1. Also, X-ray diffraction analysis was carried out to the dielectric composition, and the result confirmed that the dielectric composition had a tungsten bronze type crystal structure. That is, it was confirmed that the dielectric composition included the tungsten bronze type composite oxide as a main component.

<Preparation of Multilayer Ceramic Capacitor>

An end face of the obtained multilayer ceramic fired body was polished by using sandblast. Next, In—Ga eutectic alloy was coated as an external electrode, and a multilayer ceramic capacitor sample having the same shape as the multilayer ceramic capacitor shown in FIG. 1 was obtained. In all of the examples and the comparative examples, a size of the obtained multilayer ceramic capacitor sample was 3.2 mm×1.6 mm×1.2 mm. Also, a thickness of the dielectric layer was 3.0 μm, a thickness of the internal electrode layer was 1.5 μm, and the number of layers of the dielectric layers between the internal electrode layers were 10 layers.

<Measurement of Properties>

Regarding the obtained multilayer ceramic capacitor samples, relative permittivity, specific resistance under high temperature high electric field condition, and highly accelerated lifetime were measured using the below described methods.

(Relative Permittivity)

A digital LCR meter (4284A made by YHP) was used to measure capacitance of the multilayer ceramic capacitor sample. A measuring temperature of capacitance was 25° C., a measuring frequency was 1 kHz, and an input signal level (measuring voltage) was 1 Vrms. Relative permittivity was calculated from the obtained capacitance. Relative permittivity of 90 or higher was considered good, and 120 or higher was considered even better. Results are shown in Tables 1 to 4.

(Specific Resistance Under High Temperature High Electric Field)

Insulation resistance of the multilayer ceramic capacitor sample was measured using a digital resistance meter (R8340 made by ADVANTEST) at a measuring temperature of 150° C. A measuring voltage was 150 V (electric field intensity of 50 V/μm), and a measuring time was 60 seconds. In addition to the measured insulation resistance, an electrode area and a thickness of the dielectric layer of the multilayer ceramic capacitor sample were used to calculate specific resistance. Specific resistance of 5.0E+10 Ω·cm or higher was considered good. Note that, 5.0E+10 Ω·cm means $5.0 \times 10^{10}$ Ω·cm. Results are shown in Tables 1 to 4.

(Highly Accelerated Lifetime)

To the dielectric layer of the multilayer ceramic capacitor sample, DV voltage was applied at a measuring temperature of 230° C. and an electric field intensity of 80 V/μm (measuring voltage of 240 V), and change in the insulation resistance over the time was measured. A length of time which took the insulation resistance to drop by 1 digit from the insulation resistance at the start of the DC voltage application was defined as a failure time. Then, a mean time to failure (MTTF) was calculated which was 50% from Weibull analysis of the failure time. For each sample number, a failure time was measured using 20 samples, and MTTF calculated from the failure times of 20 samples was defined as highly accelerated lifetime. Highly accelerated lifetime of 1.0 hour or longer was considered good, and 10.0 hours of longer was considered even better. Results are shown in Tables 1 to 4.

TABLE 1

| Sample No. | x | a | b | e | R | Relative permittivity | High Temp. Specific Resistance [Ωcm] | Highly Accelerated Lifetime [h] |
|---|---|---|---|---|---|---|---|---|
| Example 1 | 0.000 | 5.100 | 0.000 | 0.100 | none | 102 | 7.4E+10 | 28.1 |
| Example 2 | 0.000 | 5.750 | 0.000 | 0.100 | none | 131 | 1.6E+11 | 61.9 |
| Example 3 | 0.000 | 5.850 | 0.050 | 0.000 | La | 116 | 3.5E+11 | 1.4 |
| Comparative example 1 | 0.000 | *6.000* | 0.000 | 0.000 | none | 105 | 2.6E+11 | *0.3* |
| Comparative example 2 | 0.100 | *5.050* | 0.050 | 0.000 | La | 103 | *8.3E+09* | 2.7 |
| Example 4 | 0.100 | 5.100 | 0.050 | 0.000 | La | 110 | 7.2E+10 | 2.8 |
| Example 5 | 0.100 | 5.500 | 0.050 | 0.000 | La | 124 | 3.0E+11 | 2.8 |
| Example 6 | 0.100 | 5.800 | 0.050 | 0.000 | La | 126 | 3.2E+11 | 2.4 |
| Example 7 | 0.100 | 5.860 | 0.050 | 0.000 | La | 117 | 2.7E+11 | 1.6 |
| Comparative example 3 | 0.100 | *5.880* | 0.050 | 0.000 | La | 109 | 2.8E+11 | *0.8* |
| Comparative example 4 | 0.250 | *5.050* | 0.050 | 0.050 | La | 108 | *7.2E+09* | 30.1 |
| Example 8 | 0.250 | 5.850 | 0.050 | −0.150 | La | 106 | 1.0E+11 | 1.4 |
| Example 9 | 0.250 | 5.850 | 0.050 | 0.000 | La | 107 | 2.3E+11 | 1.5 |
| Example 10 | 0.250 | 5.850 | 0.050 | 0.020 | La | 116 | 2.2E+11 | 67.2 |
| Example 11 | 0.250 | 5.850 | 0.050 | 0.100 | La | 110 | 2.4E+11 | 58.8 |
| Example 12 | 0.250 | 5.850 | 0.050 | 0.150 | La | 104 | 2.1E+11 | 8.7 |
| Comparative example 5 | 0.250 | *5.880* | 0.050 | 0.000 | La | 97 | 6.9E+11 | *0.8* |
| Comparative example 6 | 0.500 | *5.000* | 0.000 | 0.000 | none | 113 | *6.5E+09* | 7.8 |
| Example 13 | 0.500 | 5.100 | 0.000 | 0.150 | none | 109 | 6.8E+10 | 1.6 |
| Example 14 | 0.500 | 5.850 | 0.000 | 0.000 | none | 98 | 4.2E+11 | 1.4 |
| Example 15 | 0.500 | 5.850 | 0.050 | 0.000 | La | 95 | 4.1E+11 | 1.4 |
| Example 16 | 0.500 | 5.850 | 0.100 | 0.000 | La | 92 | 3.8E+11 | 1.5 |
| Comparative example 7 | *0.550* | 5.750 | 0.050 | 0.000 | La | *86* | 1.1E+11 | 1.6 |
| Comparative example 8 | *0.550* | 5.850 | 0.050 | 0.000 | La | *81* | 3.7E+11 | 1.3 |

TABLE 2

| Sample No. | x | a | b | e | R | Relative permittivity | High Temp. Specific Resistance [Ωcm] | Highly Accelerated Lifetime [h] |
|---|---|---|---|---|---|---|---|---|
| Comparative example 9 | 0.250 | 5.850 | 0.050 | *−0.175* | La | *65* | *8.1E+06* | *Unable to measure* |
| Example 8 | 0.250 | 5.850 | 0.050 | −0.150 | La | 106 | 1.0E+11 | 1.4 |
| Example 9 | 0.250 | 5.850 | 0.050 | 0.000 | La | 107 | 2.3E+11 | 1.5 |
| Example 10 | 0.250 | 5.850 | 0.050 | 0.020 | La | 116 | 2.2E+11 | 67.2 |
| Example 11 | 0.250 | 5.850 | 0.050 | 0.100 | La | 110 | 2.4E+11 | 58.8 |
| Example 12 | 0.250 | 5.850 | 0.050 | 0.150 | La | 104 | 2.1E+11 | 8.7 |
| Comparative example 10 | 0.250 | 5.850 | 0.050 | *0.175* | La | *83* | 1.8E+11 | 5.6 |

TABLE 3

| Sample No. | x | a | b | e | R | Relative permittivity | High Temp. Specific Resistance [Ωcm] | Highly Accelerated Lifetime [h] |
|---|---|---|---|---|---|---|---|---|
| Example 14 | 0.500 | 5.850 | 0.000 | 0.000 | none | 98 | 4.2E+11 | 1.4 |
| Example 15 | 0.500 | 5.850 | 0.050 | 0.000 | La | 95 | 4.1E+11 | 1.4 |
| Example 16 | 0.500 | 5.850 | 0.100 | 0.000 | La | 92 | 3.8E+11 | 1.5 |

TABLE 3-continued

| Sample No. | x | a | b | e | R | Relative permittivity | High Temp. Specific Resistance [Ωcm] | Highly Accelerated Lifetime [h] |
|---|---|---|---|---|---|---|---|---|
| Comparative example 11 | 0.250 | 5.750 | *0.150* | 0.000 | La | *78* | 3.8E+11 | 1.8 |
| Comparative example 12 | 0.500 | 5.850 | *0.150* | 0.000 | La | *84* | 4.0E+11 | 1.5 |

TABLE 4

| Sample No. | x | a | b | e | R | Relative permittivity | High Temp. Specific Resistance [Ωcm] | Highly Accelerated Lifetime [h] |
|---|---|---|---|---|---|---|---|---|
| Example 4 | 0.100 | 5.100 | 0.050 | 0.000 | La | 110 | 7.2E+10 | 2.8 |
| Example 17 | 0.200 | 5.300 | 0.050 | 0.000 | Nd | 108 | 8.6E+10 | 1.8 |
| Example 18 | 0.100 | 5.300 | 0.050 | 0.000 | Dy | 105 | 8.8E+10 | 1.4 |
| Example 19 | 0.200 | 5.400 | 0.050 | 0.000 | Y | 107 | 9.3E+10 | 2.2 |

Table 1 shows the examples and the comparative examples in which x and a were mainly varied. Each example having all of x, a, b, and e within predetermined ranges exhibited good properties. Examples 2, 5, and 6 in which x was within a range of 0.000≤x≤0.100 and a was within a range of 5.500≤a≤5.800 exhibited particularly good specific resistance. Examples 1, 2, 10, and 11 in which e was within a range of 0.020≤e≤0.100 exhibited particularly good highly accelerated lifetime. On the other hand, Comparative examples 7 and 8 in which x was too large exhibited decreased relative permittivity. Comparative examples 2, 4, and 6 in which a was too small exhibited decreased specific resistance under high temperature. Comparative examples 1, 3, and 5 in which a was too large exhibited decreased highly decreased lifetime.

Table 2 shows the examples and the comparative examples in which e was mainly varied. Each example having all of x, a, b, and e within predetermined ranges exhibited good properties. Examples 10 and 11 in which e was within a range of 0.020≤e≤0.100 exhibited particularly good highly accelerated lifetime. On the contrary, Comparative example 9 in which e was too small had insufficient sintering. As a result, relative permittivity, highly accelerated lifetime under high temperature, and specific resistance under high temperature decreased, thus it was unable to measure highly accelerated lifetime. Comparative example 10 in which e was too large exhibited decreased relative permittivity.

Table 3 shows the examples and the comparative examples in which b was mainly varied. Each example having all of x, a, b, and e within predetermined ranges exhibited good properties. On the contrary, Comparative examples 11 and 12 of which b was too large exhibited decreased relative permittivity.

Table 4 shows the examples in which types of R were mainly varied. In the case that x, a, b, and e were all within predetermined ranges and that these values were close to each other, good properties were obtained even when the type of R was different. Also, the properties did not change significantly even when the type of R was different.

REFERENCE SIGNS LIST

1 . . . Multilayer ceramic capacitor
10 . . . Element body

2 . . . Dielectric layer
3 . . . Internal electrode layer
4 . . . External electrode
11 . . . Thin film capacitor
111 . . . Substrate
112 . . . Lower electrode
113 . . . Dielectric thin film
114 . . . Upper electrode

What is claimed is:

1. A dielectric composition comprising a tungsten bronze type composite oxide as a main component represented by $(Ba_{1-x}Sr_x)_aR_bZr_cTa_dO_{30+0.5e}$ in terms of an atomic ratio, wherein $$c=(2a+3b-10)-e,$$

$$d=(20-2a-3b)+e,$$

R includes at least one selected from the group consisting of La, Ce, Pr, Nd, Sm, Eu, Gd, Tb, Dy, Ho, Er, Tm, Yb, Lu, Y, and Sc, $$0.000≤x≤0.500$$

$$5.100≤a≤5.860$$

$$0.000≤b≤0.100, and$$

$$-0.150≤e≤0.150.$$

2. The dielectric composition according to claim 1, wherein x is within a range of 0.000≤x≤0.100 and a is within a range of 5.500≤a≤0.800.

3. The dielectric composition according to claim 1, wherein e is within a range of 0.020≤e≤0.100.

4. The dielectric composition according to claim 2, wherein e is within a range of 0.020≤e≤0.100.

5. An electronic component comprising the dielectric composition according to claim 1.

6. An electronic component comprising the dielectric composition according to claim 2.

7. An electronic component comprising the dielectric composition according to claim 3.

8. An electronic component comprising the dielectric composition according to claim 4.

* * * * *